(12) United States Patent
Itabashi

(10) Patent No.: US 6,689,525 B2
(45) Date of Patent: Feb. 10, 2004

(54) DISPERSING AGENT FOR PIGMENT, PIGMENT-DISPERSION COMPOSITION, TONER, AND TONER PRODUCTION PROCESS

(75) Inventor: Hitoshi Itabashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/066,573

(22) Filed: Feb. 6, 2002

(65) Prior Publication Data

US 2003/0044707 A1 Mar. 6, 2003

(30) Foreign Application Priority Data

Feb. 6, 2001 (JP) .......................... 2001/029374

(51) Int. Cl.$^7$ .......................... G03G 9/09; G03G 9/097
(52) U.S. Cl. .................. 430/108.22; 430/137.15
(58) Field of Search ................ 430/108.2, 108.22, 430/108.21, 137.15; 524/88; 526/259; 540/129

(56) References Cited

U.S. PATENT DOCUMENTS

| 3,988,235 A | | 10/1976 | Shibata et al. ............... 204/266 |
| 4,013,687 A | * | 3/1977 | Paget et al. ................. 260/376 |
| 4,071,670 A | | 1/1978 | Vanzo et al. ................. 526/88 |
| 4,613,559 A | | 9/1986 | Ober et al. ................. 430/137 |
| 4,777,104 A | | 10/1988 | Matsumoto et al. ........ 430/109 |
| 5,085,966 A | * | 2/1992 | Suzuki et al. ............... 430/115 |
| 5,124,266 A | | 6/1992 | Coryn et al. ................. 436/86 |
| 5,244,979 A | * | 9/1993 | Yamamoto et al. ...... 525/329.7 |
| 5,395,544 A | | 3/1995 | Hagihara et al. ............. 252/68 |

FOREIGN PATENT DOCUMENTS

| JP | 36-10231 | 7/1961 |
| JP | 51-14895 | 2/1976 |
| JP | 53-17735 | 2/1978 |
| JP | 53-17736 | 2/1978 |
| JP | 61-18965 | 1/1986 |
| JP | 61-18966 | 1/1986 |
| JP | 61-228458 | 10/1986 |
| JP | 62-73276 | 4/1987 |
| JP | 53-17737 | 2/1989 |
| JP | 6-17073 | 1/1994 |
| JP | 2633383 | 7/1997 |

* cited by examiner

Primary Examiner—John Goodrow
(74) Attorney, Agent, or Firm—Fitzpatrick, Cella, Harper & Scinto

(57) ABSTRACT

A dispersing agent for a pigment, comprising a specific compound having a structure wherein a phthalocyanine type molecular skeleton which is adsorptive on the pigment and an oligomer unit or polymer unit which prevents re-agglomeration of the pigment to bring out the effect of dispersion are covalently bonded, and having affinity for a medium or a solvent. Also disclosed are a pigment-dispersion composition containing the dispersing agent, a toner prepared using a pigment having been treated with the dispersing agent, and a process for producing such a toner.

31 Claims, No Drawings

DISPERSING AGENT FOR PIGMENT, PIGMENT-DISPERSION COMPOSITION, TONER, AND TONER PRODUCTION PROCESS

BACKGROUND OF THE INVENTION

1. Field of the Invention

This invention relates to a dispersing agent for a pigment (hereinafter often "pigment-dispersing agent") which is to improve the dispersibility of a pigment in the process of producing coating materials, inks, toners or resin molded products, and a pigment-dispersion composition which contains the dispersing agent. This invention also relates to a toner for forming a toner image in an image-forming process such as electrophotography or electrostatic printing or a image-forming process carried out by a toner-jet method, and a process for producing such a toner.

2. Related Background Art

In the manufacture of coating materials, inks, toners or resin molded products, pigment-dispersing agents have effectively been utilized as additives for making pigments have small particle diameter so as to sufficiently bring out the performance required as coloring materials (such as coloring power, transparency and luster).

In order for a pigment-dispersing agent to exhibit its function, the agent is required to have a chemical structure that it is strongly adsorptive on the pigment in the molecule and a chemical structure that it has affinity for mediums, solvents and resins used in dispersing the pigment and can be a steric hindrance for preventing re-agglomeration of the pigment. As a dispersing agent for phthalocyanine pigments or carbon black, a derivative of phthalocyanine coloring matter is used. In order to make the pigment have general-purpose properties for various mediums, solvents and resins, it is common to separately add an agent having adsorptivity on the pigment and a resin material which has affinity for mediums, solvents and resins and can be a steric hindrance, and make these combine with each other by acid-base mutual action to bring out the function as the pigment-dispersing agent.

However, when such a two-component type dispersing agent is used, it is necessary to prepare a pigment-dispersion composition under such conditions that the bond attributable to the acid-base which keeps the both combined with each other does not break. Especially when the pigment is dispersed in an aqueous medium, attention must be paid also to the pH of water or mediums and the functional group of the resin to be added. Even when the pigment is dispersed in the state the both have dissociated, the state of dispersion to a certain extent can be achieved on account of the action of polar groups of a phthalocyanine derivative. It, however, may come into question that the pigment re-agglomerates in post steps of drying, shaping, polymerization reaction and so forth or that the pigment migrates to particle surfaces because of the presence of polar groups.

Meanwhile, toner particles used in printers and copying machines are fine particles formed chiefly of (i) a resin, (ii) a colorant such as a magnetic material, carbon black, a dye or a pigment and (iii) a wax, and have particle diameters usually ranging from 6 to 30 $\mu$m. Toner particles are commonly produced by mixing and melting a colorant comprised of a dye or pigment or a magnetic material in a thermoplastic resin to disperse the colorant uniformly in the thermoplastic resin, followed by fine pulverization and classification to obtain toner particles having a desired particle diameter. This method is relatively stable as a technique, and enables relatively easy management of materials and production steps. Since, however, the particle diameter of toner particles depends on the mechanical pulverization of resins, an attempt to make their particle diameter small to an average particle diameter of 6 $\mu$m or less results in a low yield. This is because, in view of an attribute that the charge quantity increases with a decrease in particle diameter when a toner having toner particles is electrostatically charged by means of a triboelectric charging member, its particle size distribution must be made sharp in order for the toner to be uniformly charged and this makes it necessary to remove finer power and coarse powder in a large quantity in the step of classification.

In recent years, as a method having overcome the above problem, a method of producing toner particles by polymerization (e.g., a method of producing toner particles by suspension polymerization) is proposed. Such a method is disclosed in, e.g., Japanese Patent Publication No. 36-10231 and No. 51-14895 and Japanese Patent Application Laid-open No. 53-17735, No. 53-17736 and No. 53-17737. This method is a method in which materials to be included into toner particles, such as a colorant (e.g., a magnetic material or carbon black), a charge control agent and a release agent (e.g., a wax) are dissolved or dispersed in a polymerizable monomer optionally together with a polymerization initiator and a dispersing agent to prepare a polymerizable composition, which is then dispersed in an aqueous medium containing a dispersion stabilizer, by means of a dispersion apparatus to form fine particles, and the polymerizable monomer in the fine particle is polymerized and then solidified to obtain toner particles having any desired particle diameter and composition. This method has not any pulverization step, and is expected to bring about the effect of energy saving, improvement in process yield and cost reduction. On the other hand, depending on production conditions such as the state of stirring and the size of production scale, toner particles whose particle size distribution has varied to have a relatively broad particle size distribution are obtained in many cases, and the step of classification must be carried out in many cases in order to regulate them to have a desired particle size distribution required to obtain high-quality and highly minute toner images.

As a method of producing toner particles by dispersion polymerization promising much sharper particle size distribution, a method is available which makes use of dispersion polymerization proposed in Japanese Patent Publication No. 6-17073 and Japanese Patent Application Laid-open No. 61-18965, No. 61-18966, No. 61-228458 and No. 62-73276. This is a method of producing toner particles with uniform particle size distribution by initiating polymerization reaction by heat or light, from a uniform system in which a polymeric dispersing agent, a polymerizable monomer, a polymerization initiator, a colorant, a charge control agent and so forth have been dissolved or dispersed, to form those which serve as nuclei of toner particles, and allowing the particles to grow individually. The dispersion polymerization is regarded as a reliable method of producing monodisperse particles of about 1 to 10 $\mu$m in particle diameter. Because of their very sharp particle size distribution, a toner having such toner particles can also have a sharp charge quantity distribution, and, compared with those produced by other methods, has superior dot reproducibility in development, fidelity of transfer and fixing performance. The dispersion polymerization, however, has a problem that, when used as a method of producing toner particles, the colorant such as a pigment, which tends to be insoluble in the reaction system, may enter the interiors of particles with difficulty.

In recent years, in order to overcome this problem, it is proposed in Japanese Patent No. 2,633,383 (corresponding to U.S. Pat. No. 5,124,226) to treat the surfaces of pigment particles so that the pigment can be incorporated into the toner particles with ease. According to this publication, it is disclosed that toner particles with uniform particle diameter which contain the pigment in the interiors of toner particles can be obtained using as a pigment-dispersing agent a compound having radical-polymerizable groups. In reality, however, the situation is that the pigment can slightly be incorporated into the toner particles. Accordingly, it is sought to further incorporate the pigment into toner particles to more improve coloring efficiency.

In addition, where toner particles are colored in the conventional method, the pigment is incorporated in so poor an efficiency at the initial stage of polymerization reaction that the toner particles tend to be those in which the pigment has mostly adhered to the toner particle surfaces. Thus, depending on the type of the pigment, the surfaces of toner particles have so poor environmental properties as to enable charge control with difficulty in some cases.

SUMMARY OF THE INVENTION

An object of the present invention is to provide a dispersing agent for a pigment, a pigment-dispersion composition, a toner and a toner production process which have solved the above problems.

Another object of the present invention is to provide a dispersing agent for a pigment, which can finely disperse the pigment with ease.

Still another object of the present invention is to provide a pigment-dispersion composition which can stably maintain the state of dispersion even in various post steps.

A further object of the present invention is to provide a toner having a sharp particle size distribution and a superior coloring power, and a process for producing such a toner.

A still further object of the present invention is to provide a monodisperse toner having a superior coloring efficiency, and a process for producing such a toner.

A still further object of the present invention is to provide a monodisperse toner having a superior charging performance, and a process for producing such a toner.

A still further object of the present invention is to provide a toner having toner particles in which a pigment has finely been dispersed to make the toner have superior coloring power and transparency, and a process for producing such a toner.

A still further object of the present invention is to provide, in a process for producing toner particles by polymerization making use of an aqueous medium, a toner having toner particles to the surfaces of which the colorant does not migrate and which have superior charging performance and environmental stability, and a process for producing such a toner.

To achieve the above objects, the present invention provides a dispersing agent for a pigment, comprising a compound represented by the following Formula (1) or (2).

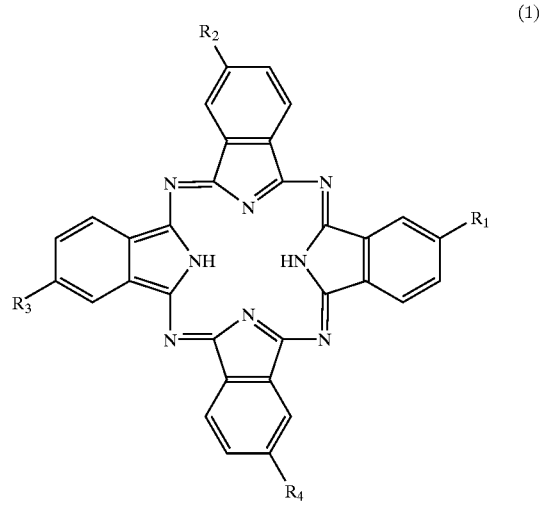

wherein at least one of $R_1$, $R_2$, $R_3$ and $R_4$ represents a substituent X:

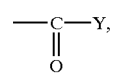

where a substituent Y represents an oligomer unit or a polymer unit,
and others each represent a hydrogen atom.

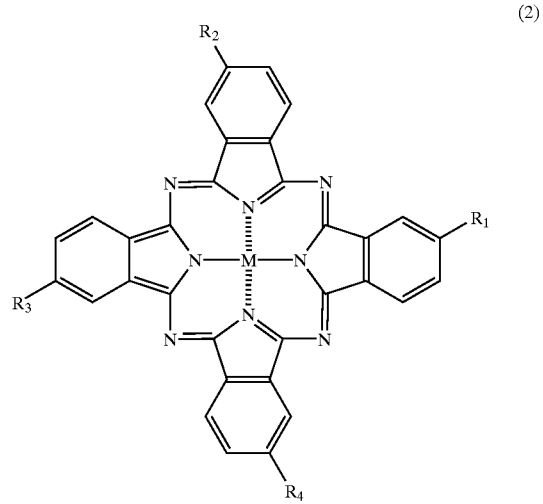

wherein at least one of $R_1$, $R_2$, $R_3$ and $R_4$ represents a substituent X:

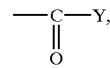

where a substituent Y represents an oligomer unit or a polymer unit,
and others each represent a hydrogen atom; and M represents a divalent metal, a tri- or tetravalent substituted metal, or an oxy-metal.

The present invention also provides a pigment-dispersion composition comprising a pigment, a dispersing agent for a pigment, and a medium, wherein the dispersing agent is a compound represented by the following Formula (1) or (2).

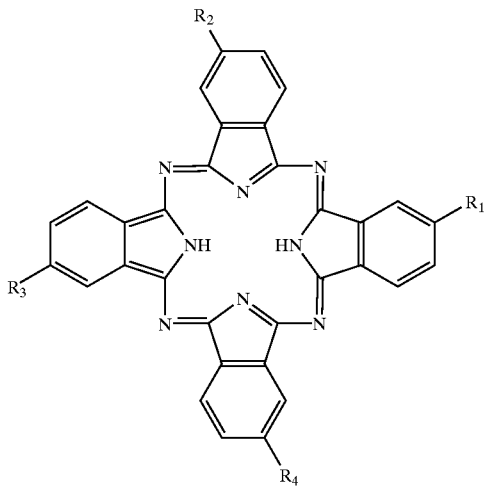
(1)

wherein at least one of $R_1$, $R_2$, $R_3$ and $R_4$ represents a substituent X:

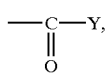

where a substituent Y represents an oligomer unit or a polymer unit,
and others each represent a hydrogen atom.

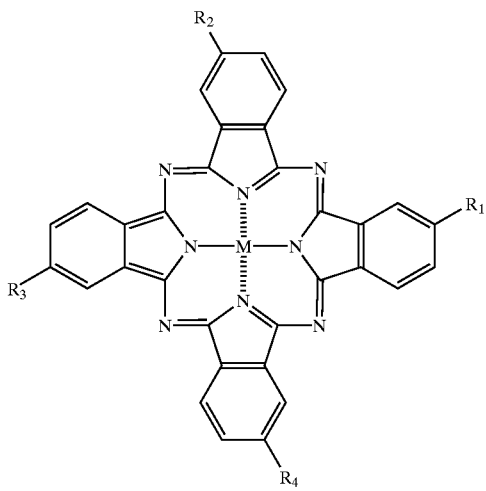
(2)

wherein at least one of $R_1$, $R_2$, $R_3$ and $R_4$ represents a substituent X:

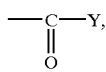

where a substituent Y represents an oligomer unit or a polymer unit,
and others each represent a hydrogen atom; and M represents a divalent metal, a tri- or tetravalent substituted metal, or an oxy-metal.

The present invention still also provides a toner comprising a binder resin and a pigment, wherein the pigment has been treated with a compound represented by the following Formula (1) or (2).

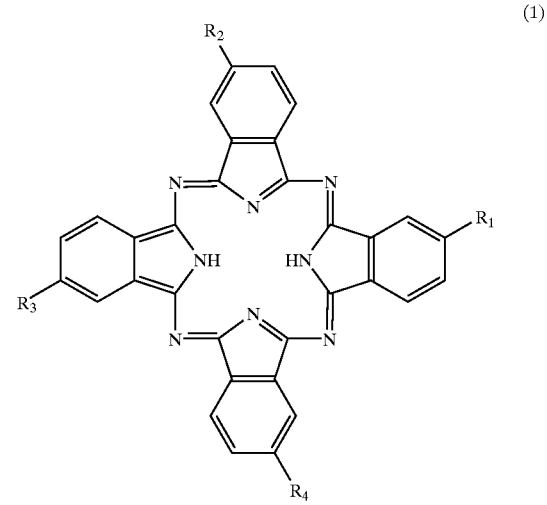
(1)

wherein at least one of $R_1$, $R_2$, $R_3$ and $R_4$ represents a substituent X:

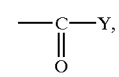

where a substituent Y represents an oligomer unit or a polymer unit,
and others each represent a hydrogen atom.

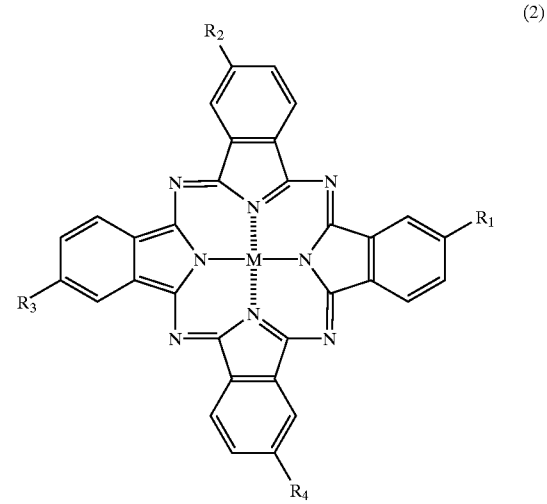
(2)

wherein at least one of $R_1$, $R_2$, $R_3$ and $R_4$ represents a substituent X:

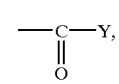

where a substituent Y represents an oligomer unit or a polymer unit, and others each represent a hydrogen atom; and M represents a divalent metal, a tri- or tetravalent substituted metal, or an oxy-metal.

The present invention further provides a process for producing a toner containing toner particles; the process comprising;

introducing a monomer composition containing at least a polymerizable monomer and a pigment, into a medium containing at least an organic solvent and a polymeric dispersion stabilizer;

dissolving at least the polymerizable monomer in the medium;

polymerizing the monomer; and precipitating from the medium a polymer formed by the polymerization to produce toner particles containing the pigment;

wherein;

the pigment has been treated with a compound represented by the following Formula (1) or (2).

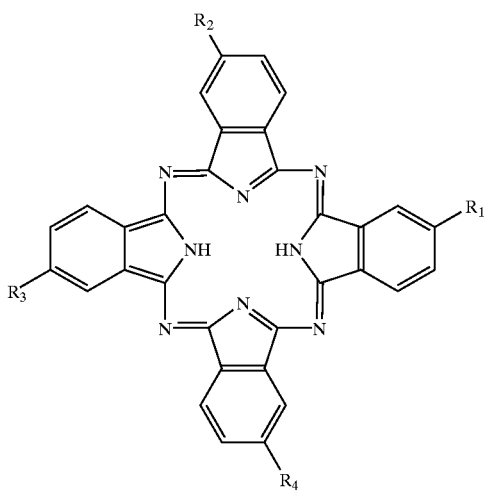

(1)

wherein at least one of $R_1$, $R_2$, $R_3$ and $R_4$ represents a substituent X:

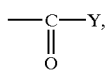

where a substituent Y represents an oligomer unit or a polymer unit, and others each represent a hydrogen atom.

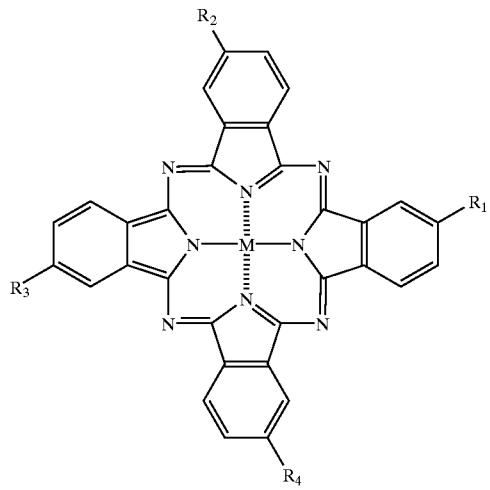

(2)

wherein at least one of $R_1$, $R_2$, $R_3$ and $R_4$ represents a substituent X:

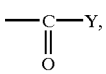

where a substituent Y represents an oligomer unit or a polymer unit, and others each represent a hydrogen atom; and M represents a divalent metal, a tri- or tetravalent substituted metal, or an oxy-metal.

DETAILED DESCRIPTION OF THE PREFERRED EMBODIMENT

The present invention is characterized in that the pigment-dispersing agent has a structure wherein a phthalocyanine type molecular skeleton which is adsorptive on the pigment and an oligomer unit or polymer unit which prevents re-agglomeration of the pigment to bring out the effect of dispersion are covalently bonded, and has affinity for a medium or a solvent.

The pigment-dispersing agent of the present invention has the structure of the above Formula (1) or (2). In Formula (1) or (2), at least one of $R_1$, $R_2$, $R_3$ and $R_4$ is the substituent X. As to the number of the substituent X, one or two of $R_1$ to $R_4$ may preferably be the substituent(s) X because the substituent X may on the one hand strengthen the affinity for a medium or a solvent described later, and may on the other hand inhibit the adsorptivity on the pigment. Other substituents are each a hydrogen atom (H). Also, the metal M in Formula (2) is a divalent metal, a tri- or tetravalent substituted metal, or an oxy-metal, which may include, e.g., metals such as Cu, Al, Fe, Co, Ni, Zn, Mg, Mn and Pb; metal chlorides such as $TiCl_2$ and $SnCl_2$; and metal oxides such as TiO and MnO.

The substituent Y, which constitutes the substituent X, is an oligomer or a polymer, and may preferably have good affinity for the medium or solvent and for a resin contained in the medium or solvent.

As the substituent Y that can be used in the present invention, a known oligomer or polymer unit may be used as the substituent. For example, it may include styrene oligomer, polystyrene, acrylic acid oligomer, polyacrylic acid, methacrylic acid oligomer, polymethacrylic acid, acrylate oligomer, polyacrylate, methacrylate oligomer, polymethacrylate, ester oligomer, polyester, vinyl ether oligomer, polyvinyl ether, vinyl methyl ether oligomer, polyvinyl methyl ether, vinyl alcohol oligomer, polyvinyl alcohol, vinyl butyral oligomer, and polyvinyl butyral. It may further include copolymers formed of a plurality of monomers used to form any of these polymers. The polymer unit is preferably a polystyrene unit, a styrene-acrylate copolymer unit, a styrene-methacrylate copolymer unit, a styrene-acrylic acid copolymer unit or a styrene-methacrylic acid copolymer unit.

The solvent that can be used in the present invention is one determined taking account chiefly of its affinity for the substituent Y. Stated specifically, the solvent may include water; alcohols such as methyl alcohol, ethyl alcohol, modified ethyl alcohol, isopropyl alcohol, n-butyl alcohol, isobutyl alcohol, tert-butyl alcohol, sec-butyl alcohol, tert-amyl alcohol, 3-pentanol, octyl alcohol, benzyl alcohol and cyclohexanol; ether alcohols such as methyl cellosolve, cellosolve, isopropyl cellosolve, butyl cellosolve, diethylene glycol and monobutyl ether; ketones such as acetone, methyl ethyl ketone and methyl isobutyl ketone; esters such as ethyl acetate, butyl acetate, ethyl propionate and cellosolve acetate; hydrocarbons such as hexane, octane, petroleum ether, cyclohexane, benzene, toluene and xylene; halogenated hydrocarbons such as carbon tetrachloride, trichloroethylene and tetrabromoethane; ethers such as ethyl ether, dimethyl glycol and trioxane tetrahydrofuran; acetals such as methylal and diethyl acetal; organic acids such as formic acid, acetic acid and propionic acid; and sulfur- or nitrogen-containing organic compounds such as nitropropene, nitrobenzene, dimethylamine, monoethanolamine, pyridine, dimethyl sulfoxide and dimethyl formamide. Two or more of any of these liquid mediums or solvents may also be used in the form of a mixture.

The liquid medium or solvent may also more preferably be a polymerizable monomer.

The polymerizable monomer that can be used in the present invention is an addition polymerization or condensation polymerization type monomer. It may preferably be an addition polymerization type monomer. Such a monomer may specifically include styrene; styrene derivatives such as o-methylstyrene, m-methylstyrene, p-methylstyrene, p-methoxystyrene, p-phenylstyrene, p-chlorostyrene, 3,4-dichlorostyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene and p-n-dodecylstyrene; ethylene unsaturated monoolefins such as ethylene, propylene, butylene and isobutylene; unsaturated polyenes such as butadiene and isoprene; vinyl halides such as vinyl chloride, vinylidene chloride, vinyl bromide and vinyl iodide; vinyl esters such as vinyl acetate, vinyl propionate and vinyl benzoate; α-methylene aliphatic monocarboxylates such as methyl methacrylate, ethyl methacrylate, propyl methacrylate, n-octyl methacrylate, dodecyl methacrylate, 2-ethylhexyl methacrylate, stearyl methacrylate, phenyl methacrylate, dimethylaminoethyl methacrylate and diethylaminoethyl methacrylate; acrylic esters such as methyl acrylate, ethyl acrylate, n-butyl acrylate, isobutyl acrylate, propyl acrylate, n-octyl acrylate, dodecyl acrylate, 2-ethylhexyl acrylate, stearyl acrylate, 2-chloroethyl acrylate and phenyl acrylate; vinyl ethers such as methyl vinyl ether, ethyl vinyl ether and isobutyl vinyl ether; vinyl ketones such as methyl vinyl ketone, hexyl vinyl ketone and methyl isopropenyl ketone; vinylnaphthalenes; and acrylic acid derivatives such as acrylonitrile, methacrylonitrile and acrylamide.

As a process for producing the pigment-dispersing agent of the present invention, any known method may be used. A method is available in which the reactivity of hydrogen of the four benzene nuclei in the phthalocyanine skeleton is utilized to effect chlorination or sulfonation to synthesize a derivative. More preferably, a carboxylated phthalocyanine can readily be synthesized using trimellitic anhydride and phthalic anhydride as materials of the carboxylated phthalocyanine. As to such a carboxylic group, a halogen can readily be replaced by an alkyl group by the Friedel-Crafts reaction through an acid halide. For example, to introduce a polystyrene unit (group), the hydrogen at the para-position of a phenyl group can readily be substituted in the presence of anhydrous aluminum chloride.

In the pigment-dispersion composition of the present invention, components other than the pigment-dispersing agent of the present invention may include a pigment, a resin, a dispersing agent, other additives, a liquid medium and a solvent. As a process for producing the pigment-dispersion composition, any known method may be used. For example, the pigment-dispersing agent and optionally the resin may be dissolved or dispersed in the liquid medium or solvent, and powder of a pigment may be added little by little with stirring to make it fit well to the liquid medium or solvent. Mechanical shear force is further applied by means of a dispersion machine such as a ball mill or a paint shaker, a dissolver, an attritor, a sand mill or a high-speed mill to make the pigment-dispersing agent adsorbed on the surfaces of particles of the pigment, and the pigment can stably finely be dispersed.

As a process for producing the toner of the present invention, any known method may be used, provided that the pigment-dispersing agent of the present invention is used in the step of dispersing the pigment.

In the case of a pulverization toner, a pigment-dispersion paste as the pigment-dispersion composition is mixed with the resin as a toner binder together with other additives, and the mixture obtained is melt-kneaded by heat and mechanical shear force. The kneaded product thus obtained is pulverized, followed by the step of classification to obtain the toner.

In a process for producing a toner by polymerization making use of an aqueous medium, in particular, a process for producing a toner by suspension polymerization, as the pigment-dispersion composition a pigment-dispersion paste making use of a polymerizable monomer may be introduced into an aqueous medium together with a polymerization initiator, and the polymerization reaction is caused by light or heat to polymerize the polymerizable monomer to obtain toner particles.

In the case of dispersion polymerization, the pigment-dispersing agent and optionally a polymeric stabilizer and other additives may be dissolved or dispersed in a polymerizable monomer, and powder of a pigment added is little by little with stirring to make it fit well to the polymerizable monomer. Mechanical shear force is further applied by means of a dispersion machine such as a ball mill or a paint shaker, a dissolver, an attritor, a sand mill or a high-speed mill to make the pigment-dispersing agent adsorbed on the surfaces of particles of the pigment, and the pigment is stably finely dispersed. The dispersion obtained is mixed with a reaction medium having an organic solvent and a polymeric dispersion stabilizer, and a polymerization initiator is added thereto. Then the polymerization reaction is caused by light or heat with gentle stirring, and a polymer formed from the polymerizable monomer is precipitated to obtain polymerization toner particles.

In the case of the dispersion polymerization, what is effective as the substituent Y in the above Formulas (1) and (2) is a styrene oligomer, a styrene polymer, an acrylic oligomer, an acrylic polymer, an ester oligomer, an ester polymer, or a copolymer of monomers for any of these. It may preferably be one having affinity for the organic solvent, the reaction medium containing a polymeric dispersion stabilizer and the polymerizable monomer. The substituent Y may preferably have a number-average molecular weight of from 300 to 30,000, which may preferably be equal to or less than the number-average molecular weight of the polymeric dispersion stabilizer. One having a number-average molecular weight smaller than 300 is not preferable because the effect of dispersing the pigment may be obtained with difficulty. If it has a number-average molecular weight larger than 30,000, the adsorptivity of the pigment-dispersing agent on the pigment may be inhibited to bring about a low dispersion effect, and also the pigment can not well be incorporated into toner particles, resulting in a low coloring power of the toner.

The polymerizable monomer that can be used in the process for production the toner of the present invention is an addition polymerization or condensation polymerization type monomer. It may preferably be an addition polymerization type monomer. The addition polymerization type monomer may specifically include styrene; styrene derivatives such as o-methylstyrene, m-methylstyrene, p-methylstyrene, p-methoxystyrene, p-phenylstyrene, p-chlorostyrene, 3,4-dichlorostyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene and p-n-dodecylstyrene; ethylene unsaturated monoolefins such as ethylene, propylene, butylene and isobutylene; unsaturated polyenes such as butadiene and isoprene; vinyl halides such as vinyl chloride, vinylidene chloride, vinyl bromide and vinyl iodide; vinyl esters such as vinyl acetate, vinyl propionate and vinyl benzoate; α-methylene aliphatic monocarboxylates such as methyl methacrylate, ethyl methacrylate, propyl methacrylate, n-octyl methacrylate, dodecyl methacrylate, 2-ethylhexyl methacrylate, stearyl methacrylate, phenyl methacrylate, dimethylaminoethyl methacrylate and diethylaminoethyl methacrylate; acrylic esters such as methyl acrylate, ethyl acrylate, n-butyl acrylate, isobutyl acrylate, propyl acrylate, n-octyl acrylate, dodecyl acrylate, 2-ethylhexyl acrylate, stearyl acrylate, 2-chloroethyl acrylate and phenyl acrylate; vinyl ethers such as methyl vinyl ether, ethyl vinyl ether and isobutyl vinyl ether; vinyl ketones such as methyl vinyl ketone, hexyl vinyl ketone and methyl isopropenyl ketone; N-vinyl compounds such as N-vinylpyrrole, N-vinylcarbazole, N-vinylindole and N-vinylpyrrolidone; vinylnaphthalenes; and acrylic or methacrylic acid derivatives such as acrylonitrile, methacrylonitrile and acrylamide.

As the pigment that can be used in the present invention, any known pigment may be used. In particular, color pigments such as phthalocyanine pigments and carbon black may preferably be used. The pigment may preferably be added in an amount of from 3 to 20 parts by weight based on 100 parts by weight of the polymerizable monomer.

The solvent that can be used in the process for production the toner of the present invention is one determined taking account chiefly of the solubility of the monomer and polymer. Stated specifically, the solvent may include water; alcohols such as methyl alcohol, ethyl alcohol, modified ethyl alcohol, isopropyl alcohol, n-butyl alcohol, isobutyl alcohol, tert-butyl alcohol, sec-butyl alcohol, tert-amyl alcohol, 3-pentanol, octyl alcohol, benzyl alcohol and cyclohexanol; ether alcohols such as methyl cellosolve, cellosolve, isopropyl cellosolve, butyl cellosolve, diethylene glycol and monobutyl ether; ketones such as acetone, methyl ethyl ketone and methyl isobutyl ketone; esters such as ethyl acetate, butyl acetate, ethyl propionate and cellosolve acetate; hydrocarbons such as hexane, octane, petroleum ether, cyclohexane, benzene, toluene and xylene; halogenated hydrocarbons such as carbon tetrachloride, trichloroethylene and tetrabromoethane; ethers such as ethyl ether, dimethyl glycol and trioxane tetrahydrofuran; acetals such as methylal and diethyl acetal; organic acids such as formic acid, acetic acid and propionic acid; and sulfur- or nitrogen-containing organic compounds such as nitropropene, nitrobenzene, dimethylamine, monoethanolamine, pyridine, dimethyl sulfoxide and dimethyl formamide. Two or more of any of these solvents may also be used in the form of a mixture. With respect to the solvent, the monomer may be in a concentration of from 1 to 80% by weight, and preferably from 10 to 65% by weight.

The polymeric dispersion stabilizer used in the process for production the toner of the present invention, any known compound may be used. As specific examples, it may include polystyrene; polystyrene derivatives such as poly-p-hydroxystyrene and polystyrene sulfonic acid; and polyacrylic acid, polymethacrylic acid, polyacrylate, polymethacrylate, polyvinyl alcohol, polyvinyl alkyl ethers, polyvinyl acetal, polyvinyl carboxylic acid, polyacrylamide, polymethacrylamide, polyacrylonitrile, polyvinyl pyridine, polyvinyl pyrrolidone, polyvinyl imidazole, polyethyleneimine, poly-2-alkyl-oxazolines, polyvinyl formamide, polyethylene, polypropylene, polyvinyl chloride, polydimethylsiloxane, polyoxyalkylene and cellulose derivatives. Two or more kinds of polymeric dispersion stabilizers may simultaneously be used, or may be used in the form of a copolymer.

As a particularly preferred embodiment, the polymeric dispersion stabilizer may be a polymer or random copolymer containing at least one of structural repeating units represented by the following Formulas (3) to (5). This is especially effective for the property of incorporating the pigment, and brings about an improvement in coloring power of the toner and a dramatic improvement in pigment incorporation efficiency.

(3)

(4)

(5)

The polymeric dispersion stabilizer may preferably have a number-average molecular weight of from 5,000 to 50,000. If it has a number-average molecular weight larger than 50,000, the reaction medium may have so high a viscosity as to tend to make particle size distribution non-uniform. If on the other hand it has a number-average molecular weight smaller than 5,000, its dispersion stabilization effect may be obtained with difficulty, making it difficult to obtain a product having good particle size distribution.

The polymeric dispersion stabilizer may also preferably be in a concentration of from 0.1 to 50% by weight, and more preferably from 0.1 to 30% by weight, based on the weight of the solvent.

The polymerization initiator used in the process for producing the toner of the present invention may include known polymerization initiators. Stated specifically, it may include azo compounds such as 2,2'-azobisisobutyronitrile, 2,2'-azobis-(2,4-dimethylvaleronitrile), 2,2'-azobis(2-methylbutyronitrile), 1,1'-azobis-(cyclohexane-1-carbonitrile), dimethyl-2,2'-azobisisobutyrate, 4,4'-azobis-4-cyanovaleronitrile and 2,2'-azobis(4-methoxy-2,4-dimethylvaleronitrile); peroxides such as benzoyl peroxide, and methyl ethyl ketone peroxide; nucleophilic reagents such as alkali metals, metal hydroxides and Grignard reagents; and protonic acid, metal halides and stabilized carbonium ions. The polymerization initiator may preferably be in a concentration of from 0.1 to 20% by weight, and more preferably from 0.1 to 10% by weight, based on the weight of the monomer.

In the case when the toner of the present invention is produced by polymerization, a chain transfer agent may be used, which may include known chain transfer agents.

In the present invention, toner additives as shown below may further be used in order to provide the toner with various properties.

In order to stabilize triboelectric charging performance of the toner, a charge control agent may be incorporated in the toner particles. In this case, it is preferable to use a charge control agent having a high toner charging speed and capable of maintaining a constant charge quantity stably. When the polymerization method is used to produce the toner particles, charge control agents having no polymerization inhibitory action are particularly preferred. Stated specifically, as negative charge control agents, preferred are metal compounds of salicylic acid, alkyl salicylic acids, dialkyl salicylic acids, naphthoic acid or dicarboxylic acids, polymer type compounds having sulfonic acid or carboxylic acid in the side chain, boron compounds, urea compounds, silicon compounds and carixarene. As positive charge control agents, preferred are quaternary ammonium salts, polymer type compounds having such a quaternary ammonium salt in the side chain, guanidine compounds, and imidazole compounds. Any of these charge control agents may preferably be added in a amount of from 0.5 to 10 parts by weight based on 100 parts by weight of the binder resin.

Additives such as a fluidity-providing agent, an abrasive, a lubricant and charge controlling particles may also externally be added to the toner particles.

As the fluidity-providing agent, metal oxides such as silicon oxide, aluminum oxide and titanium oxide may preferably be used. These may more preferably be those having been subjected to hydrophobic treatment. As the abrasive, metal oxides such as cerium oxide, aluminum oxide, magnesium oxide and chromium oxide, nitrides such as silicon nitride, carbides such as silicon carbide, and metal salts such as strontium titanate, calcium sulfate, barium sulfate and calcium carbonate may preferably be used. As the lubricant, fluorine resin powders such as vinylidene fluoride and polytetrafluoroethylene, and fatty acid metal salts such as zinc stearate and calcium stearate may preferably be used. As the charge controlling particles, metal oxides such as tin oxide, titanium oxide, zinc oxide, silicon oxide and aluminum oxide, and carbon black may preferably be used.

Any of these external additives may be used in an amount of from 0.1 part to 10 parts by weight, and preferably from 0.1 part to 5 parts by weight, based on 100 parts by weight of the toner particles. These additives may be used alone or in combination of two or more types. The toner of the present invention may be toner particles themselves, or may be toner particles to which any of the additives have been added.

The toner of the present invention may be used as a one-component developer, or may be blended with a carrier so as to be used as a two-component developer.

Triboelectric charge quantity of the toner used in the present invention is measured by a method described below.

The toner and the carrier are blended in a suitable blend quantity (2 to 15% by weight) when made into a developer, and are blended with a Turbula mixer for 180 seconds. This blended powder (developer) is put in a container made of a metal at the bottom of which a conductive screen of 635 meshes is provided, and then sucked by means of a suction device. The triboelectric charge quantity of the toner is determined from the difference in weight before and after the suction and from the potential accumulated in a capacitor connected to the container. Here, suction pressure is set at 250 mmHg. By this method, the triboelectric charge quantity (Q) is calculated according to the following expression.

$$Q(\mu C/g) = (C \times V)/(W1 - W2)$$

wherein W1 is the weight before suction, W2 is the weight after suction, C is the capacity of the capacitor, and V is the potential accumulated in the capacitor.

EXAMPLES

The present invention is described below by giving Examples. The present invention is by no means limited by these Examples. In the following, "part(s)" used in Examples all indicates "part(s) by weight".

Production Example of
Pigment-dispersing Agent A

An acid-polystyrene modified copper phthalocyanine (Formula (I) shown below) was synthesized in the following way.

(1) Synthesis of Carboxyamidated Copper Phthalocyanine:

116.4 g (0.606 mol) of trimellitic anhydride, 269.1 g (1.818 mols) of phthalic anhydride, 932.9 g (15.55 mols) of urea, 78.4 g (0.583 mol) of $CuCl_2$, 9.2 g (7.4 mmols) of ammonium molybdate and 7 liters of nitrobenzene were introduced into a 10-liter reaction vessel, and were stirred at 150 to 170° C. for 3 hours. The crystals precipitated were collected by filtration, and then washed with methanol until the nitrobenzene came to smell no longer. Thereafter, the crystals were washed with water, and then washed with methanol, followed by drying under reduced pressure at 60° C. for 24 hours to obtain 293.9 g of the desired compound.

(2) Synthesis of Carboxylated Copper Phthalocyanine:

292.9 g of the carboxyamidated copper phthalocyanine, 477.5 g (7.25 mols) of potassium hydroxide, 198 ml of water and 3 liters of triethylene glycol were introduced into a 5-liter reaction vessel, and were stirred at 120° C. for 24 hours. The reaction mixture was cooled to room temperature, and the crystals formed were collected by filtration, and then washed with hot water. The resultant crystals were suspended in water, and thereafter the suspension was made to have a pH of 1 with 6N hydrochloric acid. The crystals were filtered, washed with dilute hydrochloric acid and then washed with methanol, followed by drying under reduced pressure at 60° C. for 24 hours to obtain 161.5 g of the desired compound.

(3) Synthesis of Acid Chlorinated Copper Phthalocyanine Derivative:

40.0 g of the carboxylated copper phthalocyanine, 400 ml of toluene and 120 ml of thionyl chloride were introduced into a reaction vessel, and subsequently 2 ml of pyridine was dropwise added thereto, which were then refluxed for 10 hours. The reaction product formed was concentrated by means of an evaporator to obtain 50.2 g of the desired compound.

(4) Synthesis of Acid-polystyrene Modified Copper Phthalocyanine:

30 g of polystyrene (Mn: 3,883; Mw: 4,816), 100 ml of nitrobenzene and 10.0 g of aluminum chloride were introduced into a reaction vessel, and were stirred at room temperature for 4 hours, and thereafter 5.0 g of the acid chlorinated copper phthalocyanine was added thereto, which were then stirred at room temperature for 6 hours. The reaction product formed was diluted with 100 ml of THF (tetrahydrofuran), and thereafter dropwise added to 2 liters of methanol to effect reprecipitation purification. Washing with methanol and filtration were further repeated, followed by drying under reduced pressure at room temperature for 12 hours to obtain 31.7 g of the desired compound.

As a result of IR spectroscopy, elementary analysis and measurement of molecular weight of this final product, it was ascertained that the modification with acid-polystyrene had been made by one to two radicals per one copper phthalocyanine skeleton.

Formula (I)

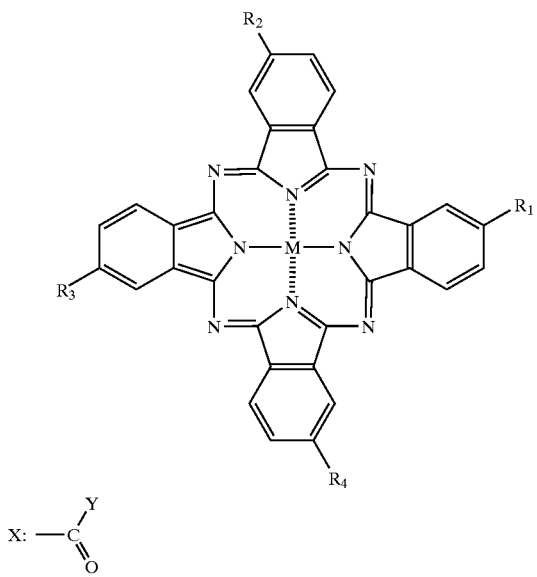

(M: Cu; $R_1$: substituent X; $R_2$ to $R_4$: H; substituent Y: polystyrene unit (Mn: 3,883; Mw: 4,816))

Production Example of Pigment-dispersing Agent B

The steps (1) to (3) in Production Example of Pigment-dispersing Agent A was repeated except that the copper of the copper phthalocyanine was replaced with aluminum, to obtain acid chlorinated aluminum phthalocyanine.

30 g of styrene-2-hydroxyethyl acrylate copolymer (30/70; Mn: 4,520; Mw: 5,500), 100 ml of nitrobenzene and 10.0 g of aluminum chloride were introduced into a reaction vessel, and were stirred at room temperature for 4 hours, and thereafter 5.0 g of the acid chlorinated aluminum phthalocyanine was added thereto, which were then stirred at room temperature for 6 hours. The reaction product formed was diluted with 100 ml of THF, and thereafter dropwise added to 2 liters of hexane to effect reprecipitation purification. This was further dried under reduced pressure at room temperature for 12 hours to obtain 28.0 g of the desired compound.

Analyses of this final product were made in the same manner as those on the pigment-dispersing agent A. As the result, it was ascertained that the modification with acid-polystyrene-2-HEMA had been made in the same proportion as that of the agent A.

Example 1

| Pigment-dispersing agent A | 2 parts |
| Styrene | 100 parts |
| Copper phthalocyanine pigment (Pigment Blue 15:3) | 15 parts |
| Glass beads (diameter: 1 mm) | 150 parts |

The above materials were mixed in a glass bottle, followed by shaking for 10 hours by means of a paint shaker with air-cooling. Thereafter, the glass beads were removed with a nylon mesh to obtain a pigment-dispersion composition (a). The pigment-dispersion composition (a) thus obtained was uniformly coated on a glass plate using a wire bar. The coating formed was naturally dried and thereafter its glossiness was measured with a glossmeter (incident angle: 75°; PG-3D, manufactured by Nippon Denshoku K. K.) to find that it was 115, showing a good smoothness. Also, a coating formed on aluminum foil in the same way was observed by scanning electron microscopy (SEM) to find that the pigment was about 50 nm in particle diameter and stood finely uniformly dispersed.

Then;

| water | 500 parts |
| polyvinyl alcohol | 3 parts | were mixed in a 3-liter flask (with a stirring blade and a condenser tube) and dissolved. To the solution formed;

| pigment-dispersion composition (a) | 100 parts |
| 2,2'-azobisisobutyronitrile | 2 parts | were mixed, followed by suspension emulsification by means of an ultrasonic homogenizer. Further, polymerization reaction was carried out at 80° C. for 20 hours with stirring. The polymer obtained was collected by filtration and then washed well with water, followed by drying under reduced pressure at 60° C. for 24 hours to obtain toner particles. The toner particles thus obtained were observed by SEM. As the result, any pigment particles were hardly seen on the toner particle surfaces except cross sections of broken toner particles.

Example 2

| | |
|---|---|
| Pigment-dispersing agent B | 2 parts |
| Ethanol | 100 parts |
| Copper phthalocyanine pigment (Pigment Blue 15:3) | 15 parts |
| Glass beads (diameter: 1 mm) | 150 parts |

The above materials were mixed in a glass bottle, followed by shaking for 10 hours by means of a paint shaker with air-cooling. Thereafter, the glass beads were removed with a nylon mesh to obtain a pigment-dispersion composition (b). The pigment-dispersion composition (b) thus obtained was uniformly coated on a glass plate using a wire bar. The coating formed was naturally dried and thereafter its glossiness was measured to find that it was 110, showing a good smoothness. Also, a coating formed on aluminum foil in the same way was observed by SEM to find that the pigment was about 50 nm in particle diameter and stood finely uniformly dispersed.

Example 3

| | |
|---|---|
| Pigment-dispersing agent B | 2 parts |
| Ethanol | 100 parts |
| Acidic carbon black | 15 parts |
| Glass beads (diameter: 1 mm) | 150 parts |

The above materials were mixed in a glass bottle, followed by shaking for 10 hours by means of a paint shaker with air-cooling. Thereafter, the glass beads were removed with a nylon mesh to obtain a pigment-dispersion composition (c). The pigment-dispersion composition (c) thus obtained was uniformly coated on a glass plate using a wire bar. The coating formed was naturally dried and thereafter its glossiness was measured to find that it was 114, showing a good smoothness. Also, a coating formed on aluminum foil in the same way was observed by SEM to find that the pigment was about 20 nm in particle diameter and stood finely uniformly dispersed.

Comparative Example 1

| | |
|---|---|
| Styrene | 100 parts |
| Copper phthalocyanine pigment (Pigment Blue 15:3) | 15 parts |
| Glass beads (diameter: 1 mm) | 150 parts |

The above materials were mixed in a glass bottle, followed by shaking for 10 hours by means of a paint shaker with air-cooling. Thereafter, the glass beads were removed with a nylon mesh to obtain a pigment-dispersion composition (d). The pigment-dispersion composition (d) thus obtained was uniformly coated on a glass plate using a wire bar. The coating formed was naturally dried and thereafter its glossiness was measured to find that it was 75, showing a poor smoothness. Also, a coating formed on aluminum foil in the same way was observed by SEM to find that pigment particles were constituted of a mixture of i) particles of about 50 nm in diameter which were considered to be primary particles and ii) coarse particles of 100 to 200 nm in diameter as agglomerates of the primary particles.

Comparative Example 2

| | |
|---|---|
| SOLSPERSE 5000 (available from Zeneca Co.) | 0.5 part |
| SOLSPERSE 17000 (ditto) | 2 parts |
| Styrene | 100 parts |
| Copper phthalocyanine pigment (Pigment Blue 15:3) | 15 parts |
| Glass beads (diameter: 1 mm) | 150 parts |

The above materials were mixed in a glass bottle, followed by shaking for 10 hours by means of a paint shaker with air-cooling. Thereafter, the glass beads were removed with a nylon mesh to obtain a pigment-dispersion composition (e). The pigment-dispersion composition (e) thus obtained was uniformly coated on a glass plate using a wire bar. The coating formed was naturally dried and thereafter its glossiness was measured to find that it was 116, showing a good smoothness. Also, a coating formed on aluminum foil in the same way was observed by SEM to find that the pigment was about 50 nm in particle diameter and stood finely uniformly dispersed.

Then;

| | |
|---|---|
| water | 500 parts |
| polyvinyl alcohol | 3 parts | were mixed in a 3-liter flask (with a stirring blade and a condenser tube) and dissolved, and the pH of the mixture formed was adjusted to 9. To the solution formed;

| | |
|---|---|
| pigment-dispersion composition (e) | 100 parts |
| 2,2'-azobisisobutyronitrile | 2 parts | were mixed, followed by suspension emulsification by means of an ultrasonic homogenizer and polymerization reaction in the same manner as in Example 1. The polymer obtained was collected by filtration and then washed well with water, followed by drying to obtain toner particles. The toner particles thus obtained were observed by SEM. As the result, many pigment particles were seen present at the toner particle surfaces. Ultra-thin slices of particles were also observed by transmission electron microscopy (TEM) to find that the pigment stood dispersed in their interiors but agglomerate layers of the pigment were present about the particle surfaces.

Example 4
Pigment-dispersion Composition (Paste)
Preparation Example 1

| | |
|---|---|
| Styrene monomer | 340 parts |
| Pigment-dispersing agent of Formula (I) | 4 parts |
| Copper phthalocyanine (Pigment Blue 15:3) | 20 parts |

The above materials were well premixed in a container. Thereafter, keeping the resultant mixture at 20° C. or below, this was dispersed for about 4 hours by means of a bead mill to prepare a pigment-dispersion composition (paste) (f). The pigment-dispersion composition (f) thus obtained was uniformly coated on a glass plate using a wire bar. The coating formed was naturally dried and thereafter its glossiness was measured to find that it was 116, showing a good smoothness. Also, a coating formed on aluminum foil in the same way was observed by SEM to find that the pigment was about 50 nm in particle diameter and stood finely uniformly dispersed.

Toner Preparation Example 1

Into 710 parts of ion-exchanged water, 450 parts of an aqueous 0.1M-$Na_3PO_4$ solution was introduced, and the mixture obtained was heated to 60° C., followed by stirring at 11,000 rpm by means of TK-type homomixer (manufactured by Tokushu Kika Kogyo). Then, 70 parts of an aqueous 1.0M-$CaCl_2$ solution was slowly added thereto to obtain a dispersion medium containing $Ca_3(PO_4)_2$.

| | |
|---|---|
| Pigment-dispersion composition (f) | 182 parts |
| 2-Ethylhexyl acrylate | 30 parts |
| Paraffin wax (m.p.: 75° C.) | 60 parts |
| Styrene-methacrylic acid-methyl methacrylate copolymer | 5 parts |
| Di-tert-butylsalicylic acid metal compound | 3 parts |

The above materials were heated to 60° C., and dissolved and dispersed to form a monomer mixture. Keeping the resultant mixture at 60° C., 10 parts by weight of a polymerization initiator 2,2'-azobisisobutyronitrile was further added and dissolved to prepare a polymerizable monomer composition.

This monomer composition was introduced into the dispersion medium prepared in a 2-liter flask of the above homomixer. These were then stirred at 10,000 rpm for 20 minutes by means of the TK-type homomixer at 60° C. in an atmosphere of nitrogen to granulate the monomer composition. Thereafter, reaction was carried out at 60° C. for 3 hours with stirring using a paddle stirring blade, and thereafter polymerization was carried out at 80° C. for 10 hours. After the polymerization was completed, the reaction product was cooled, and hydrochloric acid was added to dissolve the $Ca_3(PO_4)_2$, followed by filtration, water washing, and then drying to obtain polymerization toner particles.

Evaluation of Toner Prepared

The particle diameter of the toner particles obtained was measured with a Coulter counter to reveal that the toner particles had a weight average particle diameter of 8.0 μm. Toner particle surfaces were observed by scanning electron microscopy (SEM). As the result, any pigment particles were not observable. Cross sections of the toner particles were further observed by transmission electron microscopy (TEM) according to the dyed ultra-thin slice method to ascertain that the particles each stood separated into a shell composed chiefly of styrene-acrylic resin and a core composed chiefly of wax, to have a capsule structure. It was also ascertained that pigment particles of about 55 nm in diameter were finely dispersed in the styrene-acrylic resin layer.

To 100 parts of the toner particles obtained, 0.7 part of hydrophobic fine silica powder having a specific surface area of 200 $m^2/g$ as measured by the BET method was externally added. Then, 7 parts of the resultant toner and 93 parts of a ferrite carrier having been surface-coated with a styrene-methyl methacrylate copolymer and having an average particle diameter of 45 μm were blended to obtain a two-component developer. Sampling 1 g of the two-component developer thus obtained, the triboelectric charge quantity of the toner was measured by the blow-off method to find that it was 18.9 μC/g.

Using this two-component developer, image reproduction was tested on a remodeled machine of a full-color copying machine CLC-500, manufactured by CANON INC. Development was made under conditions of an environment of temperature 23° C./humidity 60%RH and a development contrast of 300 V. The images obtained were in an appropriate toner laid-on quantity, in a high density and in a good fine-line reproduction, thus high-quality images were obtained. The like evaluation was also made in an environment of low temperature and low humidity (15° C./15% RH) and an environment of high temperature and high humidity (30° C./75% RH). As the result, in every environment any fog did not occur and changes in image density were small, thus the toner proved to have a good charging performance. Also, images were reproduced on OHP sheets in the same way and were projected on a screen, using an OHP (overhead projector). As the result, highly transparent cyan-color projected images were obtained.

Example 5

Pigment-dispersion Composition (Paste) Preparation Example 2

| | |
|---|---|
| Styrene monomer | 320 parts |
| n-Butyl acrylate | 80 parts |
| Pigment-dispersing agent of the following Formula (II) | 4 parts |
| Copper phthalocyanine (Pigment Blue 15:3) | 20 parts |

The above materials were well premixed in a container. Thereafter, keeping the resultant mixture at 20° C. or below, this was dispersed for about 4 hours by means of a bead mill to prepare a pigment-dispersion composition (paste) (g).

Formula (II)

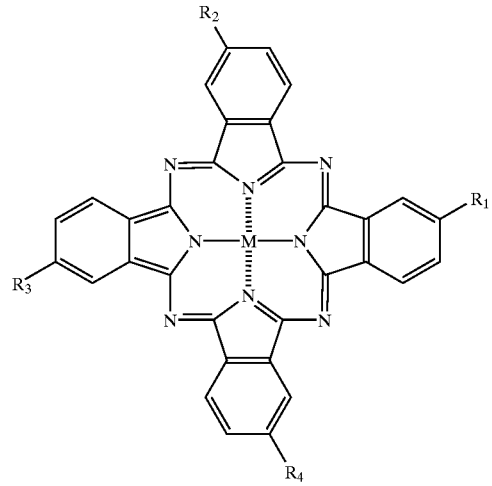

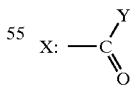

(M: Cu; $R_1$: substituent X; $R_2$ to $R_4$: H; substituent Y: styrene-n-butyl acrylate copolymer unit (80:20; Mn: 3,883; Mw: 4,816))

The pigment-dispersion composition (g) thus obtained was uniformly coated on a glass plate using a wire bar. The coating formed was naturally dried and thereafter its glossiness was measured to find that it was 119, showing a good smoothness. Also, a coating formed on aluminum foil in the same way was observed by SEM to find that the pigment was about 50 nm in particle diameter and stood finely uniformly dispersed.

Toner Preparation Example 2

A dispersion medium containing $Ca_3(PO_4)_2$ was obtained in the same manner as in Toner Preparation Example 1.

| | |
|---|---|
| Pigment-dispersion composition (g) | 212 parts |
| Paraffin wax (m.p.: 75° C.) | 60 parts |
| Styrene-methacrylic acid copolymer (95:5; Mw: 50,000) | 5 parts |
| Di-tert-butylsalicylic acid metal compound | 3 parts |

The above materials were heated to 60° C., and dissolved and dispersed to form a monomer mixture. Keeping the resultant mixture at 60° C., 10 parts by weight of a polymerization initiator 2,2'-azobis(2,4-dimethylvaleronitrile) was further added and dissolved to prepare a polymerizable monomer composition.

This monomer composition was introduced into the dispersion medium prepared in a 2-liter flask of the above homomixer. These were then stirred at 10,000 rpm for 20 minutes by means of the TK-type homomixer at 60° C. in an atmosphere of nitrogen to granulate the monomer composition. Thereafter, reaction was carried out at 60° C. for 1 hour with stirring using a paddle stirring blade, and thereafter polymerization was carried out at 80° C. for 12 hours. After the polymerization was completed, the reaction product was cooled, and hydrochloric acid was added to dissolve the $Ca_3(PO_4)_2$, followed by filtration, water washing, and then drying to obtain polymerization toner particles.

Evaluation of Toner Prepared

The particle diameter of the toner particles obtained was measured with a Coulter counter to reveal that the toner particles had a weight average particle diameter of 8.4 µm. Toner particle surfaces were observed by SEM in the same manner as in Example 4. As the result, any pigment particles were not observable like those in Example 4. Cross sections of the toner particles were further observed by TEM in the same manner as in Example 4 to ascertain that the particles had the same capsule structure as those in Example 4, and also to ascertain that pigment particles of about 50 nm in diameter were uniformally finely dispersed in the styrene-acrylic resin layer.

A two-component developer was prepared in the same manner as in Example 4, where the triboelectric charge quantity of the toner was found to be $-21.1$ µC/g. Using this two-component developer, image reproduction was tested in the same manner as in Example 4 on the remodeled machine of a full-color copying machine CLC-500, manufactured by CANON INC. The images obtained were in an appropriate toner laid-on quantity, in a high density and in a good fine-line reproduction, thus high-quality images were obtained. The like evaluation was also made in an environment of low temperature and low humidity (15° C./15% RH) and an environment of high temperature and high humidity (30° C./75% RH). As the result, in every environment any fog did not occur and changes in image density were small, thus the toner proved to have a good charging performance. Also, images were reproduced on OHP sheets in the same way and were projected on a screen, using an OHP. As the result, highly transparent cyan-color projected images were obtained.

Comparative Example 3
Pigment-dispersion Composition (Paste)
Preparation Example 3

| | |
|---|---|
| Styrene monomer | 320 parts |
| n-Butyl acrylate | 80 parts |
| Copper phthalocyanine (Pigment Blue 15:3) | 20 parts |

The above materials were well premixed in a container. Thereafter, keeping the resultant mixture at 20° C. or below, this was dispersed for about 4 hours by means of a bead mill to prepare a pigment-dispersion composition (paste) (h).

The pigment-dispersion composition (h) thus obtained was uniformly coated on a glass plate in the same manner as in Example 4. The coating formed was naturally dried and thereafter its glossiness was measured to find that it was 79, and no smoothness was achievable. Also, a coating formed on aluminum foil in the same way as in Example 4 was observed by SEM to find that coarse particles of about 200 nm in diameter and up to fine particles of about 50 nm in diameter were present, showing a great scattering of particle size distribution because of agglomeration of the pigment.

Toner Preparation Example 3

A dispersion medium containing $Ca_3(PO_4)_2$ was obtained in the same manner as in Toner Preparation Example 1.

| | |
|---|---|
| Pigment-dispersion composition (h) | 212 parts |
| Paraffin wax (m.p.: 75° C.) | 60 parts |
| Styrene-methacrylic acid copolymer (95:5; Mw: 50,000) | 5 parts |
| Di-tert-butylsalicylic acid metal compound | 3 parts |

The above materials were heated to 60° C., and dissolved and dispersed to prepare a monomer mixture. Subsequently, in the same manner as in Example 4, a polymerization initiator was added and granulation and polymerization were carried out, followed by filtration, washing, and then drying to obtain a polymerization toner.

Evaluation of Toner Prepared

The particle diameter of the toner particles obtained was measured with a Coulter counter to reveal that the toner particles had a weight average particle diameter of 8.1 µm. Toner particle surfaces were observed by SEM in the same manner as in Example 4. As the result, any pigment particles were not observable like those in Example 4. Cross sections of the toner particles were further observed by TEM in the same manner as in Example 4 to ascertain that the particles had the same capsule structure as those in Example 4 except that acicular pigment particles of about 50 to 200 nm in diameter were dispersed in the styrene-acrylic resin layer. Also, many pigment particles were seen to be deposited at the boundaries between the wax and the styrene-acrylic resin.

A two-component developer was prepared in the same manner as in Example 4, where the triboelectric charge quantity of the toner was found to be $-20.6$ µC/g. Using this two-component developer, image reproduction was tested in the same manner as in Example 4 on the remodeled machine of a full-color copying machine CLC-500, manufactured by CANON INC. The images obtained were in an appropriate toner laid-on quantity and in a good fine-line reproduction. In the evaluation also made in an environment of low temperature and low humidity (15° C./15% RH) and an environment of high temperature and high humidity (30° C./75% RH), any fog did not occur in every environment, thus the toner proved to have a good charging performance. However, when images were reproduced on OHP sheets in the same way and were projected using an OHP, projected images having a transparency slightly inferior to those in Example 4 were formed, and chroma was not so high as that in Example 4.

Comparative Example 4
Pigment-dispersion Composition (Paste)
Preparation Example 4

| | |
|---|---|
| SOLSPERSE 5000 (available from Zeneca Co.) | 0.5 part |
| SOLSPERSE 17000 (ditto) | 2 parts |
| Styrene monomer | 320 parts |
| n-Butyl acrylate | 80 parts |
| Copper phthalocyanine (Pigment Blue 15:3) | 20 parts |

The above materials were well premixed in a container. Thereafter, keeping the resultant mixture at 20° C. or below, this was dispersed for about 4 hours by means of a bead mill to prepare a pigment-dispersion composition (paste) (i).

The pigment-dispersion composition (i) thus obtained was uniformly coated on a glass plate using a wire bar. The coating formed was naturally dried and thereafter its glossiness was measured to find that it was 118, showing a good smoothness. Also, a coating formed on aluminum foil in the same way was observed by SEM to find that the pigment was about 50 nm in particle diameter and stood finely uniformly dispersed.

Toner Preparation Example 4
A dispersion medium containing $Ca_3(PO_4)_2$ was obtained in the same manner as in Toner Preparation Example 1.

| | |
|---|---|
| Pigment-dispersion composition (i) | 212 parts |
| Paraffin wax (m.p.: 75° C.) | 60 parts |
| Styrene-methacrylic acid copolymer (95:5; Mw: 50,000) | 5 parts |
| Di-tert-butylsalicylic acid metal compound | 3 parts |

The above materials were heated to 60° C., and dissolved and dispersed to prepare a monomer mixture. Subsequently, in the same manner as in Example 4, a polymerization initiator was added and granulation and polymerization were carried out, followed by filtration, washing, and then drying to obtain a polymerization toner.

Evaluation of Toner Prepared
The particle diameter of the toner particles obtained was measured with a Coulter counter to reveal that the toner had a weight average particle diameter of 8.0 μm. Toner particle surfaces were observed by SEM in the same manner as in Example 4. As the result, many pigment particles having a particle diameter of about 50 nm were observed. Cross sections of the toner particles were further observed by TEM in the same manner as in Example 4 to ascertain that the particles had the same capsule structure as those in Example 4, and also to ascertain that pigment particles of about 50 nm in diameter were finely uniformly dispersed in the styrene-acrylic resin layer.

A two-component developer was prepared in the same manner as in Example 4, where the triboelectric charge quantity of the toner was found to be −15.5 μC/g. Using this two-component developer, image reproduction was tested in the same manner as in Example 4 on the remodeled machine of a full-color copying machine CLC-500, manufactured by CANON INC. The images obtained were in an appropriate toner laid-on quantity, but fog occurred a little. In the evaluation also made in an environment of high temperature and high humidity (30° C./75% RH), fog was seen to occur greatly, thus it was ascertained that the toner had environmental properties inferior to the toner of Example 4. Meanwhile, in the image reproduction on OHP sheets, the same transparency as that in Example 4 was ascertained.

Example 6
Pigment-dispersion Composition (Paste)
Preparation Example 5

| | |
|---|---|
| Methanol | 100 parts |
| Styrene monomer | 80 parts |
| Pigment-dispersing agent of the following Formula (III) | 2 parts |
| Copper phthalocyanine (Pigment Blue 15:3) | 12 parts |

The above materials were well premixed in a container. Thereafter, keeping the resultant mixture at 20° C. or below, this was dispersed for about 4 hours by means of a bead mill to prepare a pigment-dispersion composition (paste) (j).

Formula (III)

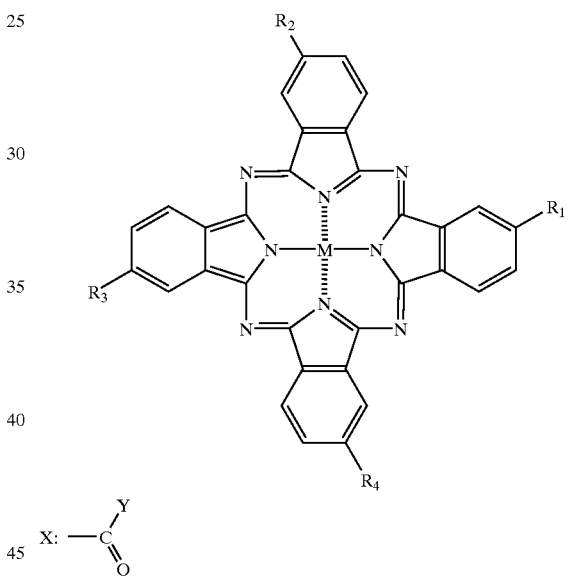

(M: Cu; $R_1$: substituent X; $R_2$ to $R_4$: H; substituent Y: styrene-acrylic acid-α-methylstyrene copolymer unit (copolymerization ratio: 2:1.5:1; Mn: 12,300; Mw: 17,700))

The pigment-dispersion composition (j) thus obtained was uniformly coated on a glass plate using a wire bar. The coating formed was naturally dried and thereafter its glossiness was measured to find that it was 110, showing a good smoothness. Also, a coating formed on aluminum foil in the same way was observed by SEM to find that the pigment was about 50 nm in particle diameter and stood finely uniformly dispersed.

Toner Preparation Example 5

| | |
|---|---|
| Methanol | 215 parts |
| Styrene-acrylic acid-α-methylstyrene copolymer (copolymerization ratio: 2:1.5:1; Mn: 21,600; Mw: 34,400) | 35 parts |
| Styrene monomer | 40 parts |
| n-Butyl acrylate | 20 parts |

-continued

| | |
|---|---|
| Pigment-dispersion composition (j) | 97 parts |
| Chromium complex salt of di-tert-butylsalicylic acid | 3 parts |
| 2,2'-Azobisisobutyronitrile | 6 parts |

In a separable flask having a reflux tube, a thermometer and a nitrogen feed tube, the above materials were mixed with stirring to carry out nitrogen bubbling at 20 cc/minute for about 30 minutes. Thereafter, the liquid temperature was raised to 65° C. to effect reflux for about 20 hours. After polymerization reaction, the reaction mixture obtained was repeatedly filtered with methanol to wash the styrene-acrylic acid-α-methylstyrene copolymer, a polymeric dispersion stabilizer. At the time of filtration, the washing was rapidly operable because the pigment and so forth came less liberated. Thereafter, the toner particles obtained were further vacuum-dried to obtain toner particles. The toner particles thus obtained were toner particles having a number-average particle diameter of 3.88 μm and a standard deviation of 0.55, showing a very sharp particle size distribution. Cross sections of the toner particles obtained were also observed by TEM. As the result, many pigment particles of copper phthalocyanine were seen to be present about the centers of toner particles. Thus, it was able to ascertain that the pigment was internally added in a high efficiency.

Evaluation of Toner Prepared

To 100 parts of the toner particles obtained, 2 parts of hydrophobic fine silica powder having a BET specific surface area of 360 m$^2$/g, having been disintegration treated, was mixed and externally added by means of a midget high-speed agitator to prepare a toner. Then, 4% by weight of this toner and 96% by weight of a ferrite carrier having an average particle diameter of 36 μm were blended by agitating them using a Turbula mixer to prepare a two-component developer. Sampling 1 g of the two-component developer thus obtained, the triboelectric charge quantity of the toner was measured by the blow-off method to find that it was −27.3 μC/g.

This two-component developer was put in a remodeled machine of a full-color laser copying machine CLC-500, manufactured by CANON INC., and image reproduction was tested. Development conditions were so set as to be an alternating electric field of 2 kV (peak-to-peak voltage), a rectangular wave with a frequency of 2 kHz and a development bias of −460 V. Also, development contrast (Vcont) was set at 300 V, and fog take-off voltage (Vback) at 100 V. Under these development conditions, digital latent images on the photosensitive member were developed, and the developed images were transferred and fixed at optimized transfer current value, fixing-assembly temperature and process speed. A test chart was placed on an original glass plate, and its hard copies were taken under the above conditions in an environment of normal temperature and normal humidity (23° C./60% RH). As the result, the images obtained were in an appropriate toner laid-on quantity, in a high density and in a good fine-line reproduction, thus high-quality images were obtained. The like evaluation was also made in an environment of low temperature and low humidity (15° C./15% RH) and an environment of high temperature and high humidity (30° C./75% RH). As the result, in every environment any fog did not occur and changes in image density were small, thus the toner proved to have a good charging performance.

Comparative Example 5

A pigment-dispersion composition (paste) was prepared in the same manner as in Example 6 except that the pigment-dispersing agent was not used. Dispersibility was evaluated in the same manner as in Example 6. As the result, the glossiness of the pigment-dispersion composition was found to be 75, and no smoothness was achievable. In the SEM observation, pigment particles of about 50 to 200 nm in diameter were mixedly present, and the pigment stood agglomerated remarkably. Using this pigment, toner particles were prepared in the same manner as in Example 6. The pigment having liberated from toner particles at the time of filtration and washing of the toner particles tended to clog filter paper, so that it took a time to operate. The toner particles thus obtained had a number-average particle diameter of 4.1 μm and a standard deviation of 0.34.

Ultra-thin slices of the toner particles were also prepared, and cross sections of the particles were observed by TEM, where pigment particles of copper phthalocyanine were present also in the interiors of the toner particles, but many were present collectively in the vicinity of the toner particle surfaces.

A two-component developer was prepared in the same manner as in Example 6, where the triboelectric charge quantity of the toner was found to be −20.5 μC/g. Using this two-component developer, image reproduction was evaluated in the same manner as in Example 6. As the result, image density was inferior to that in Example 6, and fog occurred in the environment of high humidity and high temperature.

Example 7

Pigment-dispersion Composition (Paste)

Preparation Example 6

| | |
|---|---|
| Methanol | 100 parts |
| Styrene monomer | 80 parts |
| Pigment-dispersing agent of the following Formula (IV) | 2 parts |
| Aluminum phthalocyanine | 12 parts |

The above materials were well premixed in a container. Thereafter, keeping the resultant mixture at 20° C. or below, this was dispersed for about 4 hours by means of a bead mill to prepare a pigment-dispersion composition (paste) (k).

Formula (IV)

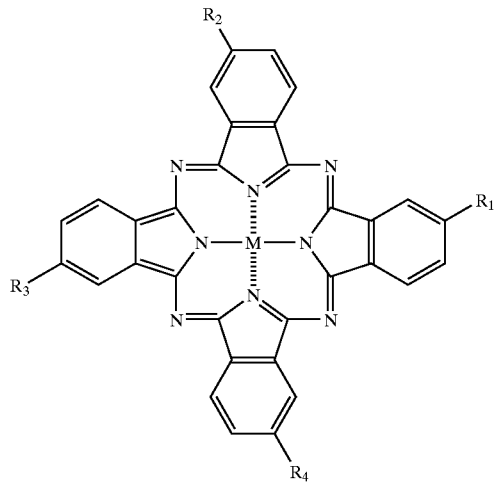

-continued

(M: Al; $R_1$: substituent X; $R_2$ to $R_4$: H; substituent Y: styrene-2-ethylhexyl methacrylate copolymer unit (polymerization ratio: 3:7; Mn: 29,300; Mw: 54,700))

On the pigment-dispersion composition (k) thus obtained, the glossiness was measured in the same manner as in Example 6 to find that it was 112, showing a good smoothness. Also, as a result of the SEM observation, the pigment was found to stood finely uniformly dispersed like that in Example 6.

Toner Preparation Example 6

| | |
|---|---|
| Methanol | 215 parts |
| Styrene-2-ethylhexyl methacrylate copolymer (copolymerization ratio: 3:7; Mn:10,300; Mw:19,200) | 35 parts |
| Styrene monomer | 40 parts |
| n-Butyl acrylate | 20 parts |
| Pigment-dispersion composition (k) | 97 parts |
| Chromium complex salt of di-tert-butylsalicylic acid | 3 parts |
| 2,2'-Azobisisobutyronitrile | 6 parts |

In a separable flask having a reflux tube, a thermometer and a nitrogen feed tube, the above materials were mixed with stirring to carry out nitrogen bubbling at 20 cc/minute for about 30 minutes. Thereafter, the liquid temperature was raised to 65° C. to effect reflux for about 20 hours. After polymerization reaction, the reaction mixture obtained was repeatedly filtered with methanol to wash the styrene-2-ethylhexyl methacrylate copolymer, a polymeric dispersion stabilizer. At the time of filtration, like Example 6, the washing was rapidly operable because the pigment and so forth came less liberated. Thereafter, the toner particles obtained were further vacuum-dried to obtain toner particles. The toner particles thus obtained were toner particles having a number-average particle diameter of 3.39 μm and a standard deviation of 0.48, showing a very sharp particle size distribution. Cross sections of the toner particles obtained were also observed by TEM. As the result, many pigment particles of aluminum phthalocyanine were seen to be present about the centers of toner particles. Thus, it was able to ascertain that the pigment was internally added in a high efficiency.

Evaluation of Toner Prepared

A two-component developer was prepared in the same manner as in Example 6, and the triboelectric charge quantity of the toner was measured to find that it was −25.0 μC/g.

This two-component developer was put in a remodeled machine of a full-color laser copying machine CLC-500, manufactured by CANON INC., and image reproduction was tested under the same conditions as in Example 6. As the result, the images obtained were in an appropriate toner laid-on quantity, in a high density and in a good fine-line reproduction, thus high-quality images were obtained. The like evaluation was also made in an environment of low temperature and low humidity (15° C./15% RH) and an environment of high temperature and high humidity (30° C./75% RH). As the result, in every environment any fog did not occur and changes in image density were small, thus the toner proved to have a good charging performance.

Example 8
Pigment-dispersion Composition (Paste)
Preparation Example 7

| | |
|---|---|
| Methanol | 100 parts |
| Styrene monomer | 80 parts |
| Pigment-dispersing agent of the following Formula (V) | 2 parts |
| Copper phthalocyanine (Pigment Blue 15:3) | 12 parts |

The above materials were well premixed in a container. Thereafter, keeping the resultant mixture at 20° C. or below, this was dispersed for about 4 hours by means of a bead mill to prepare a pigment-dispersion composition (paste) (1).

Formula (V)

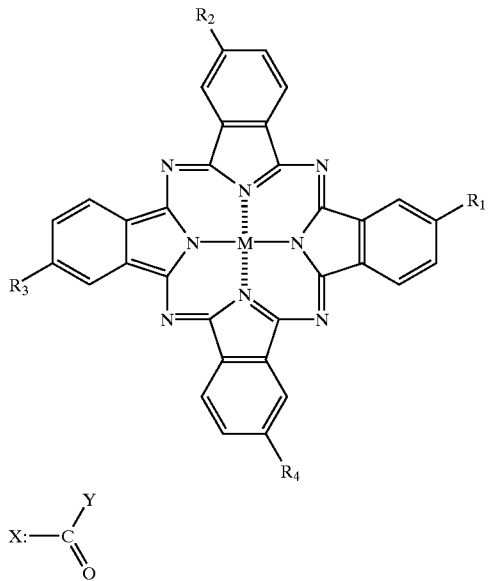

(M: Cu; $R_1$: substituent X; $R_2$ to $R_4$: H; substituent Y: styrene-acrylic acid copolymer unit (polymerization ratio: 6:4; Mn: 8,700; Mw: 12,900))

On the pigment-dispersion composition (1) thus obtained, the glossiness was measured in the same manner as in Example 6 to find that it was 109, showing a good smoothness. Also, as a result of the SEM observation, the pigment was found to stood finely uniformly dispersed like that in Example 6.

Toner Preparation Example 8

A toner was prepared in the same manner as in Example 6 except that the pigment-dispersion composition (1) was used in place of the pigment-dispersion composition (j). At the time of filtration, like Example 6, the washing was rapidly operable because the pigment and so forth came less liberated. Thereafter, the toner particles obtained were further vacuum-dried to obtain toner particles. The toner particles thus obtained were toner particles having a number-average particle diameter of 4.11 μm and a standard deviation of 0.52, showing a very sharp particle size distribution. Cross sections of the toner particles obtained were also observed by TEM. As the result, many pigment particles of copper phthalocyanine were seen to be present about the centers of toner particles. Thus, it was able to ascertain that the pigment was internally added in a high efficiency.

Evaluation of Toner Prepared

A two-component developer was prepared in the same manner as in Example 6, and the triboelectric charge quantity of the toner was measured to find that it was −26.5 μC/g.

Using this two-component developer, image reproduction was tested under the same conditions as in Example 6. As the result, the images obtained were in an appropriate toner laid-on quantity, in a high density and in a good fine-line reproduction, thus high-quality images were obtained. The like evaluation was also made in an environment of low temperature and low humidity (15° C./15% RH) and an environment of high temperature and high humidity (30° C./75% RH). As the result, in every environment any fog did not occur and changes in image density were small, thus the toner proved to have a good charging performance.

Example 9
Pigment-dispersion Composition (paste)
Preparation Example 8:

| Methanol | 100 parts |
| Styrene monomer | 80 parts |
| Pigment-dispersing agent of the following Formula (VI) | 2 parts |
| Copper phthalocyanine (Pigment Blue 15:3) | 12 parts |

The above materials were well premixed in a container. Thereafter, keeping the resultant mixture at 20° C. or below, this was dispersed for about 4 hours by means of a bead mill to prepare a pigment-dispersion composition (paste) (m).

Formula (VI)

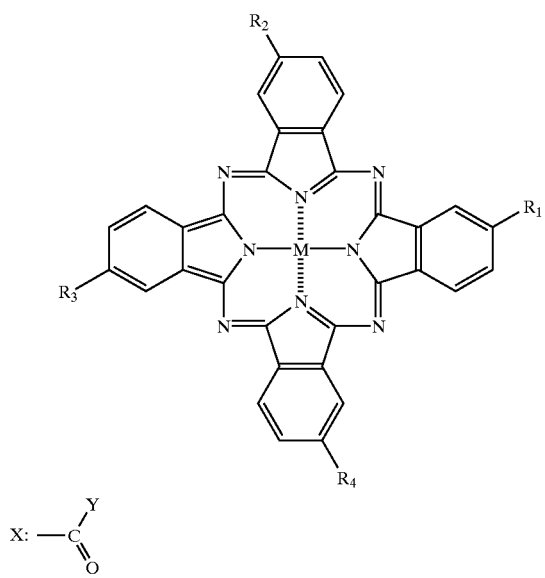

(M: Cu; $R_1$: substituent X; $R_2$ to $R_4$: H; substituent Y: polystyrene unit (Mn: 6,500; Mw: 10,100))

On the pigment-dispersion composition (m) thus obtained, the glossiness was measured in the same manner as in Example 6 to find that it was 113, showing a good smoothness. Also, as a result of the SEM observation, the pigment was found to stood finely uniformly dispersed like that in Example 6.

Toner Preparation Example 9

A toner was prepared in the same manner as in Example 6 except that the pigment-dispersion composition (m) was used in place of the pigment-dispersion composition (j). When the pigment-dispersion composition (m) was mixed with the reaction medium, the pigment agglomerated, and masses of the pigment settled at the bottom of the flask. After the polymerization reaction, the reaction mixture was filtered in the same manner as in Example 6, where the filter paper was clogged with the liberated pigment, so that it became difficult to operate the washing. Coarse particles of the pigment were removed with a nylon mesh. Thereafter, the particles were taken out by decantation and then washed by filtration. Thereafter, the toner particles obtained were further vacuum-dried to obtain toner particles. The toner particles thus obtained were toner particles having a number-average particle diameter of 4.02 $\mu$m and a standard deviation of 0.52, showing a very sharp particle size distribution. However, probably because the pigment incorporated into the toner particles was in a small quantity, a little light-blue toner particles were formed. Cross sections of the toner particles obtained were also observed by TEM. As the result, although some pigment particles were seen to be present also about the centers of toner particles, most pigment particles stood deposited in the vicinity of the toner particle surfaces, and many coarse particles of about 200 nm to 1 $\mu$m were seen which were due to the agglomeration of the pigment, considered to have occurred at the time of the above mixing.

Evaluation of Toner Prepared

A two-component developer was prepared in the same manner as in Example 6, and the triboelectric charge quantity of the toner was measured to find that it was −17.1 $\mu$C/g.

Using this two-component developer, image reproduction was tested under the same conditions as in Example 6. As the result, although the images obtained were in an appropriate toner laid-on quantity, they were in a low density and also fog occurred. The like evaluation was also made in an environment of high temperature and high humidity (30° C./75% RH). As the result, the fog occurred more greatly.

What is claimed is:

1. A toner comprising toner particles containing at least a binder resin and a pigment, wherein the pigment has been treated with a pigment-dispersing agent comprising a compound represented by the following Formula (1) or (2), (1)

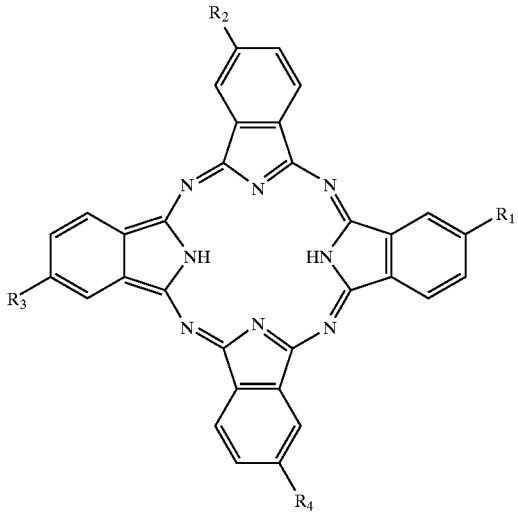

wherein at least one of $R_1$, $R_2$, $R_3$ and $R_4$ represents a substitute X:

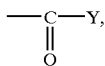

wherein a substituent Y is a polymer unit selected from the group consisting of a polystyrene unit, a styrene-acrylate copolymer unit, a styrene-methacrylate copolymer unit, a styrene-acrylic acid copolymer unit and a styrene-methacrylic-acid copolymer unit, and others each represent a hydrogen atoms,

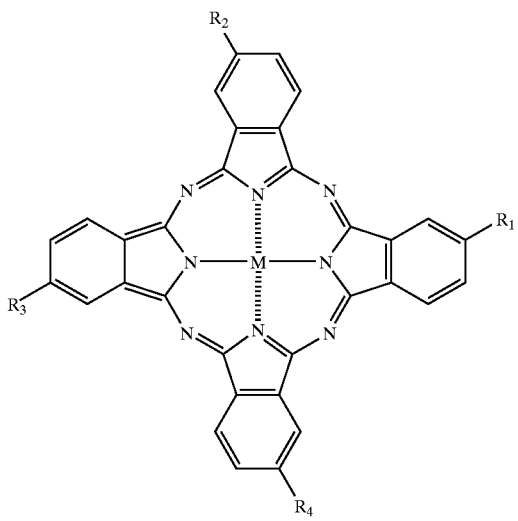

(2)

wherein at least one of $R_1$, $R_2$, $R_3$ and $R_4$ represents a substituent X:

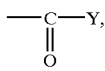

wherein a substituent Y is a polymer unit selected from the group consisting of a polystyrene unit, a styrene-acrylate copolymer unit, a styrene-methacrylate copolymer unit, a styrene-acrylic acid copolymer unit and a styrene-methacrylic acid copolymer unit, and others each represent a hydrogen atom, and M represents a divalent metal, a tri- or tetravalent substituted metal, or an oxy-metal.

2. The toner according to claim 1, wherein the toner particles are toner particles formed by subjecting a polymerizable monomer composition containing at least the pigment having been treated with the compound represented by Formula (1) or (2) and a polymerizable monomer, to heat or light to cause the polymerizable monomer to undergo polymerization reaction.

3. The toner according to claim 2, wherein the toner particles are toner particles prepared by suspension polymerization.

4. The toner according to claim 1, wherein the toner particles are toner particle prepared by dispersion polymerization.

5. The toner according to claim 1, wherein the toner particles are toner particle prepared by:

introducing a monomer composition containing at least a polymerizable monomer and the pigment, into a medium containing at least an organic solvent and a polymeric dispersion stabilizer;

dissolving at least the polymerizable monomer in the medium;

polymerizing the monomer; and precipitating from the medium a polymer formed by the polymerization.

6. The toner according to claim 5, wherein the substituent Y of the dispersing agent has at least one structure of a repeating unit constituting the polymeric dispersion stabilizer.

7. The toner according to claim 6, wherein the polymeric dispersion stabilizer is a polymer or random copolymer containing at least one of repeating units represented by the following Formulas (3) to (5)

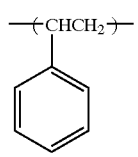

(3)

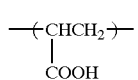

(4)

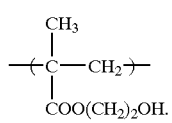

(5)

8. The toner according to claim 7, wherein the polymeric dispersion stabilizer has a number-average molecular weight of from 5,000 to 50,000 and the substituent Y of the dispersing agent has a number-average molecular weight of from 300 to 30,000.

9. A process for producing a toner containing toner particles; the process comprising:

introducing a monomer composition containing at least a polymerizable monomer and a pigment, into a medium containing at least on organic solvent and a polymeric dispersion stabilizer;

dissolving at least the polymerizable monomer in the medium;

polymerizing the monomer; and precipitating from the medium a polymer formed by the polymereization;

to produce toner particles containing the pigment; wherein;

the pigment has been treated with a pigment-dispersing agent comprising a compound represented by the following Formula (1) or (2),

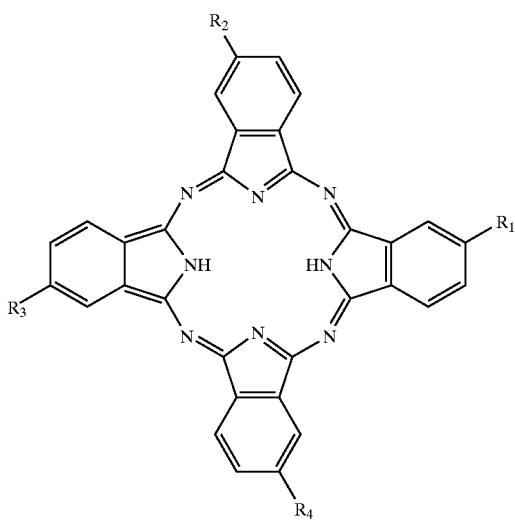

(1)

wherein at least one of $R_1$, $R_2$, $R_3$ and $R_4$ represents a substituent X:

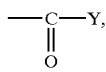

wherein a substituent Y is a polymer unit selected from the group consisting of a polystyrene unit, a styrene-acrylate copolymer unit, a styrene-methacrylate copolymer unit, a styrene-acrylic acid copolymer unit and a styrene-methacrylic-acid copolymer unit, and others each represent a hydrogen atom,

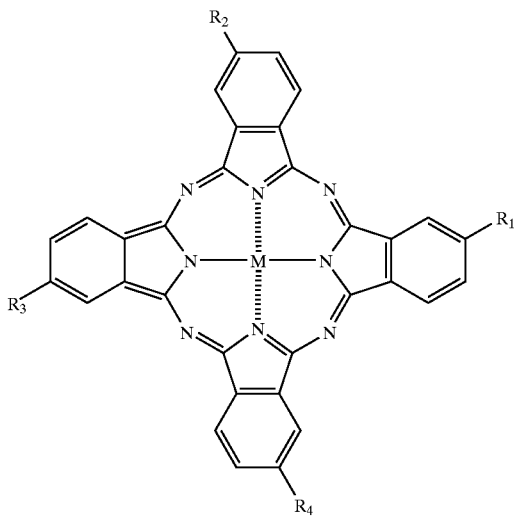

(2)

wherein at least one of $R_1$, $R_2$, $R_3$ and $R_4$ represents a substituent X:

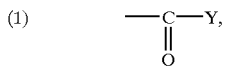

wherein a substituent Y is a polymer unit selected from the group consisting of a polystyrene unit, a styrene-acrylate copolymer unit, a styrene-methacrylate copolymer unit, a styrene-acrylic acid copolymer unit and a styrene-methacrylic acid copolymer unit, and others each represent a hydrogen atom; and M represents a divalent metal, a tri- or tetravalent substituted metal, or an oxy-metal.

10. The process according to claim 9, wherein the substituent Y of the dispersing agent has at least one structure of a repeating unit constituting the polymeric dispersion stabilizer.

11. The process according to claim 10, wherein the polymeric dispersion stabilizer is a polymer or random polymer containing at least one of repeating units represented by the following Formulas (3) to (5),

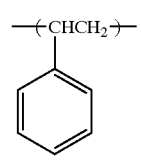

(3)

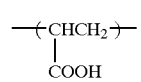

(4)

(5)

12. The process according to claim 11, wherein the polymeric dispersion stabilizer has a number-average molecular weight of from 5,000 to 50,000, and the substituent Y of the dispersing agent has a number-average molecular weight of from 300 to 30,000.

13. A process for producing a toner containing toner particles; the process comprising;

dispersing in an aqueous medium a monomer composition containing at least a polymerizable monomer and a pigment, to form particles finely dispersed to have the particle diameter of the toner; and polymerizing and solidifying the monomer held in the particles thus formed, to form the toner particles;

wherein;

the pigment has been treated with a pigment-dispersing agent comprising a compound represented by the following Formula (1) or (2), (1)

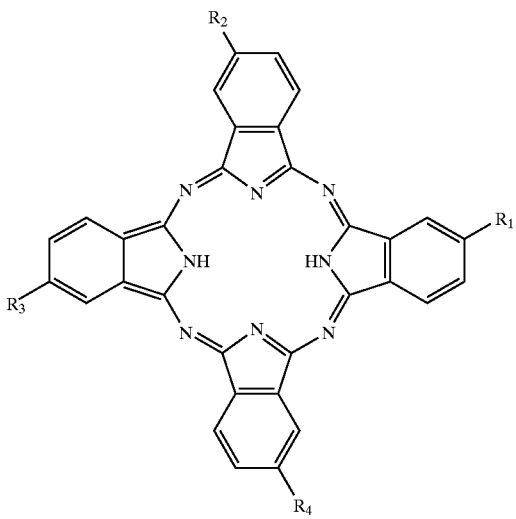

wherein at least one of $R_1$, $R_2$, $R_3$ and $R_4$ represents a substituent X:

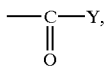

wherein a substituent Y is a polymer unit selected from the group consisting of a polystyrene unit, a styrene-acrylate copolymer unit, a styrene-methacrylate copolymer unit, a styrene-acrylic acid copolymer unit and a styrene-methacrylic acid copolymer unit, and others each represent a hydrogen atom, (2)

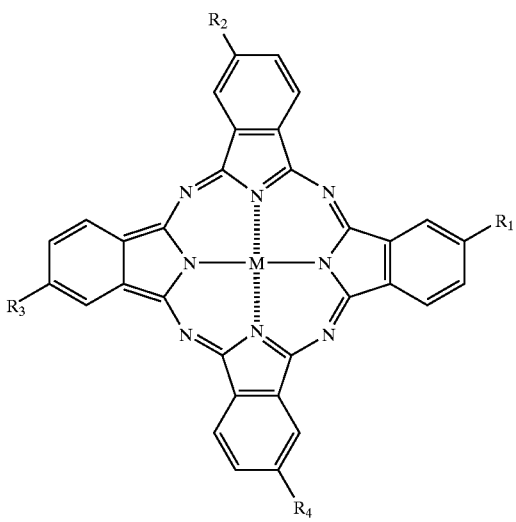

wherein at least one of $R_1$, $R_2$, $R_3$ and $R_4$ represents a substituent X:

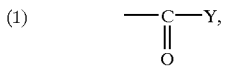

wherein a substituent Y is a polymer unit selected from the group consisting of a polystyrene unit, a styrene-acrylate copolymer unit, a styrene-methacrylate copolymer unit, a styrene-acrylic acid copolymer unit and a styrene-methacrylic acid copolymer unit, and others each represent a hydrogen atom; and M represents a divalent metal, a tri- or tetravalent substituted metal, or an oxy-metal.

14. The toner according to claim 1, wherein the substituent Y has a number-average molecular weight of from 300 to 30,000.

15. The toner according to claim 1, wherein one or two of $R_1$, $R_2$, $R_3$ and $R_4$ is, or are each, the substituent X.

16. The toner according to claim 1, wherein M is a metal selected from the group consisting of Cu, Al, Fe, Co, Ni, Zn, Mg and Pb.

17. The toner according to claim 1, wherein M is $TiCl_2$ or $SnCl_2$.

18. The toner according to claim 1, wherein M is TiO or MnO.

19. The toner according to claim 1, wherein M is copper or aluminum.

20. The process according to claim 9, wherein the substituent Y has a number-average molecular weight of from 300 to 30,000.

21. The process according to claim 9, wherein one or two of $R_1$, $R_2$, $R_3$ and $R_4$ is, or are each, the substituent X.

22. The process according to claim 9, wherein M is a metal selected from the group consisting of Cu, Al, Fe, Co, Ni, Zn, Mg and Pb.

23. The process according to claim 9, wherein M is $TiCl_2$ or $SnCl_2$.

24. The process according to claim 9, wherein M is TiO or MnO.

25. The process according to claim 9, wherein M is copper or aluminum.

26. The process according to claim 13, wherein the substituent Y has a number-average molecular weight of from 300 to 30,000.

27. The process according to claim 13, wherein one or two of $R_1$, $R_2$, $R_3$ and $R_4$ is, or are each, the substituent X.

28. The process according to claim 13, wherein M is a metal selected from the group consisting of Cu, Al, Fe, Co, Ni, Zn, Mg and Pb.

29. The process according to claim 13, wherein M is $TiCl_2$ or $SnCl_2$.

30. The process according to claim 13, wherein M is TiO or MnO.

31. The process according to claim 13, wherein M is copper or aluminum.

* * * * *

UNITED STATES PATENT AND TRADEMARK OFFICE
CERTIFICATE OF CORRECTION

PATENT NO.   : 6,689,525 B2
DATED        : February 10, 2004
INVENTOR(S)  : Hitoshi Itabashi It is certified that error appears in the above-identified patent and that said Letters Patent is hereby corrected as shown below:

Title page,
Item [30], Foreign Application Priority Data, "2001-029374" should read -- 2001-029374 --.
Item [56], References Cited, FOREIGN PATENT DOCUMENTS,
"JP    53-17737 2/1989" should read -- JP    53-17737  2/1978 --.

Column 1,
Line 10, "often" should read -- called --;
Line 23, "have" should read -- having --; and
Line 50, "the" should read -- in which --.

Column 10,
Line 58, "added is" should read -- is added --.

Column 11,
Lines 25 and 65, "the" (first occurrence) should read -- of the --.

Column 12,
Line 24, "The" should read -- As the --; and
Line 25, "the" (first occurrence) should read -- of the --.

Column 27,
Line 14, "stood" should read -- be --.

Column 28,
Line 14, "stood" should read -- be --.

Colunm 29,
Line 58, "stood" should read -- be --.

Column 31,
Line 2, "substitute" should read -- substituent --;
Line 13, "atoms," should read -- atom, --; and
Line 66, "particle" should read -- particles --.

UNITED STATES PATENT AND TRADEMARK OFFICE
CERTIFICATE OF CORRECTION

PATENT NO. : 6,689,525 B2
DATED : February 10, 2004
INVENTOR(S) : Hitoshi Itabashi It is certified that error appears in the above-identified patent and that said Letters Patent is hereby corrected as shown below:

Column 32,
Line 2, "particle" should read -- particles --;
Lines 35-40, 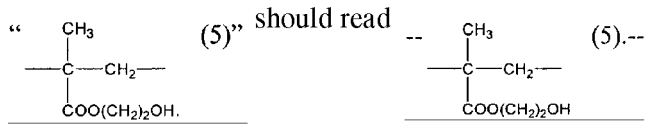

Line 54, "on" should read -- an --.

Column 34,
Lines 38-42, 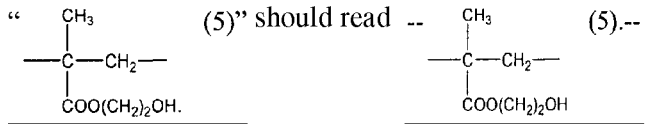

Line 53, "particles;" should read -- particles, --.

Signed and Sealed this

Tenth Day of August, 2004

JON W. DUDAS
*Acting Director of the United States Patent and Trademark Office*